March 26, 1940. E. GIFFONIELLO ET AL 2,194,747
WINDOW OPERATING MEANS
Filed Nov. 27, 1937
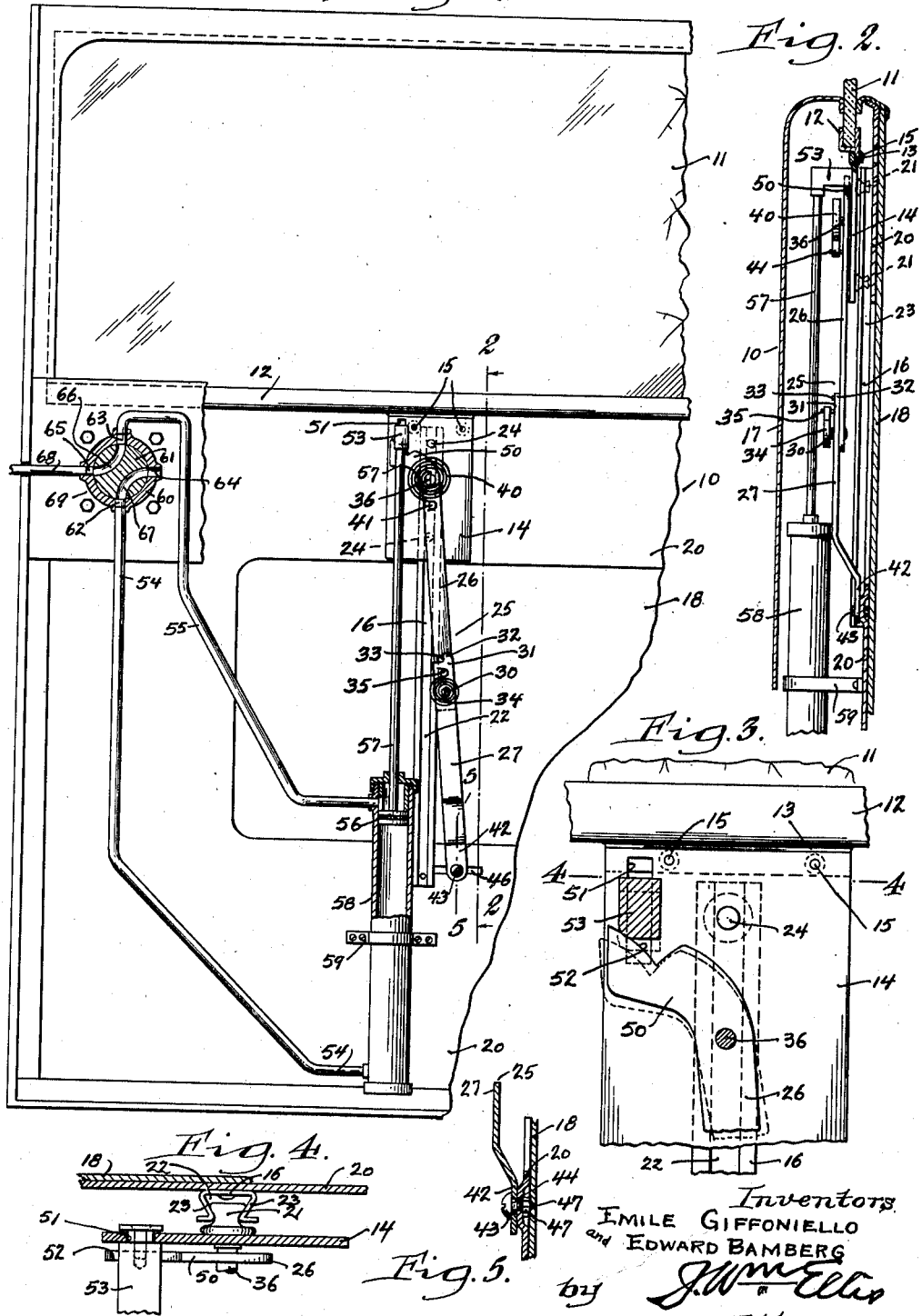
Inventors
EMILE GIFFONIELLO
and EDWARD BAMBERG
by
Attorney Patented Mar. 26, 1940

2,194,747

UNITED STATES PATENT OFFICE 2,194,747

WINDOW OPERATING MEANS

Emile Giffoniello and Edward Bamberg,
Buffalo, N. Y.

Application November 27, 1937, Serial No. 176,926

7 Claims. (Cl. 268—125)

Our invention relates in general to window operating means such as those employed in automobiles and other vehicles, and in particular to a device of this nature which is controlled and actuated by vacuum.

One of the principal objects of our invention has been to provide a device having a centrally-arranged guide member, whereby the window will be easily movable in either direction without binding.

Another object has been to provide a device of this nature having means for forcing the window to its finally closed position, such means also acting as a positive lock to prevent the window from being pried open.

Another object of our invention has been to provide a mechanism for positively controlling a vehicle window in either direction of movement by means of vacuum.

Moreover, our device is provided with cam means connected between the vacuum-operated means and the means for locking the window, whereby it may be unlocked only through the medium of such suction means.

Moreover, our device is provided with means whereby a broken window may be easily removed and replaced.

Furthermore, it has been an object to provide a device of this nature which shall be simple and inexpensive to manufacture and of relatively few parts so that it will not easily get out of order.

The above objects and advantages have been accomplished by the device shown in the accompanying drawing, of which:

Fig. 1 is a fragmentary elevation of an automobile door, equipped with our invention.

Fig. 2 is a fragmentary, sectional elevation taken on line 2—2 of Fig. 1.

Fig. 3 is an enlarged, fragmentary, front view of the lock releasing means.

Fig. 4 is a fragmentary, cross-sectional view taken on line 4—4 of Fig. 3.

Fig. 5 is an enlarged, fragmentary, sectional view taken on line 5—5 of Fig. 1.

In the drawing, we have shown our device as applied to an automobile door 10, it being obvious that our invention is applicable to the windows of railroad cars and the like. The automobile door is provided with the usual window pane 11 which is slidable vertically in a well known manner.

The window pane of our invention is mounted in the customary guides formed by the door structure and is carried by a window channel 12, which is of usual construction, the window being secured within the channel by any suitable means. Arranged near the center of the channel is a downwardly extending flange 13 which is detachably secured to the siding plate 14 of our invention by means of removable bolts 15, thereby permitting a broken window to be easily replaced without having to disassemble the window operating means. The sliding plate 14 is mounted for vertical, reciprocating movement upon a guide 16. The door shown in Fig. 1 is viewed from the outside thereof with the outside metal or covering 17 removed and viewed toward the back or upholstered side of the door, showing the metal panel 20 thereof to which the parts of our device are secured. This panel 20 is covered, as usual, with the inner upholstering 18 of the door. The guide 16 is secured by suitable means to the panel 20 and may be so designed that it can be shifted sidewise to align the window when the parts are being assembled. The siding plate 14 is movable vertically upon the guide 16, guide pins 21 being secured to the plate and extending into a dove-tail channel 22 formed in the guide. The dove-tail channel 22 is preferably formed by the inwardly converging side walls 23 of the guide. The guide pins 21 are formed with tapered peripheries which fit the dove-tail channel 22, whereby the pins will be retained within the channel, thus holding the plate 14 in place and, at the same time, providing for free and easy movement of the plate up and down the guide. Each of the pins is provided with a suitable stud 24 which is suitably secured to the plate.

Connecting the sliding plate 14 with the plate 20 of the door is a toggle, stop-link 25. This link comprises an upper link portion 26 and a lower link portion 27. These link portions are connected together at their adjacent ends by means of a suitable link pivot pin 30. The lower link portion 27 has an upwardly extending arm 31 which overlaps the upper link portion 26 and which is provided with a stop lug 32 that engages a stop pin 33 carried by the upper link portion 26 when the link portions have been moved to their straight-line positions, as shown in Fig. 1. A spiral, link-retracting spring 34 is preferably arranged about the stop-link pivot pin 30, having its inner end secured to said pin and its outer end engaging with a pin 35, whereby the link portions will be urged toward the straight-line position when the window has been moved to the closed position shown in Fig. 1. The upper end of the upper link portion 26 is pivotally secured to the plate by means of an upper link pivot pin 36 which is preferably rigidly carried by the plate and has pivotal connection with the link. A spiral, link-retracting spring 40 is also provided for this link and it has its inner end carried by the upper link pivot pin 36 and its outer end secured to a pin 41 carried by the link portion. This spring, coacting with the link-retracting spring 34, serves to urge the upper and lower link portions 26 and 27, respectively, toward the straight-line position shown in Fig. 1, and to keep them in such position until the links are operated, as hereinafter described. The lower end 42 of the lower link portion 27 of the toggle stop-link is offset, as shown in Fig. 2, and it is secured to the plate 20 by means of an adjustable bolt 43 (see Fig. 5). This bolt is formed with a bearing portion 44 which passes through the lower end of the link portion 27 and with a screw-threaded portion 45. This screw-threaded portion is smaller in diameter than the bearing portion 44, whereby a shoulder is provided for engagement with the inner face of the plate 20. The screw-threaded portion is disposed within a slot 46 formed in the plate 20, and a nut 47 is disposed on the screw-threaded portion 45 and bears on the outer surface of the panel 20. By means of the slot and adjustable bolt 43, the lower end of the lower link portion of the toggle stop-link may be moved sidewise within the slot, whereby the window may be adjusted to its final closed position, such adjustment being brought about by reason of the fact that the toggle stop-link is arranged at an angle, as shown in Fig. 1, and a movement of the lower end thereof to the right or to the left of the slot will serve to raise or lower the entire link and thus bring about the adjustment above mentioned.

A cam arm 50 is provided at the upper end of the upper link portion 26 of the toggle stop-link and, as clearly shown in Figs. 1 and 3, this arm is curved toward one side of the main axis of the link portion so as to be in cooperative relation with a guide slot 51 formed in the sliding plate 14 at one side thereof. The cam arm 50 is formed with a cam face 52 which is in engageable relation with a cam block 53 slidably mounted within the guide slot 51 of the sliding plate. As shown by dotted lines in Fig. 3, when the guide block 53 is drawn downwardly within the slot 51, it will engage with the cam surface 52 of the cam arm 50 and serve to rotate the upper link portion 26 upon its pivot 36 in counterclockwise direction. This partial rotation will serve to move the upper and lower link portions 26 and 27, respectively, out of straight-line position and thus release the locked position of the toggle stop-link, thereby permitting the window to be lowered.

Our device is operated preferably by vacuum produced by the engine of the motor vehicle to which the device is applied. Obviously, however, instead of vacuum, fluid under pressure might be used to actuate the operating means. As shown in the drawing, an actuating cylinder 58 is mounted at the lower part of the door and preferably secured to the panel 20 by means of a clip or strap 59. The cylinder is provided with the customary piston 56 carried by a piston rod 57. The piston rod extends upwardly and is secured, by suitable means, to the cam block 53.

The piston is preferably pneumatically actuated for closing as well as opening the window and, therefore, a pipe 54 is connected at the lower end of the cylinder and a pipe 55 at the upper end thereof. These pipes are connected to a suitable control valve 69. This valve comprises a casing 60 and a rotary plug 61. The pipe 54 is connected to a casing port 62 and the pipe 55 is connected to a casing port 63. The ports 62 and 63 are preferably diametrically opposite each other. An exhaust port 64 is arranged at right angles to the ports 62 and 63, and diametrically opposite the port 64 is a port 65 to which is connected a suction pipe 68, the other end of which is attached to a suitable source of suction (not shown). The plug 61 is provided with two passageways 66 and 67. These passageways are so positioned that adjacent ports of the valve casing may be connected together as, for instance, the suction pipe 68 may be connected, through the port 65, with the pipe 55, through the port 63, by means of the passageway 66. Likewise, the pipe 54 may be connected, through the port 62, with the atmospheric port 64 by means of the passageway 67. By rotating the valve 90° in clockwise direction, the passageway 67 will connect the pipe 54, through the port 62, with the suction pipe 68, through the port 65, and the passageway 66 will connect the pipe 55, through the port 63, with the atmosphere through the port 64.

As shown in Fig. 1, the window pane 11 has been moved to and locked in its closed position. As shown in this figure, the toggle stop-link is in straight-line position and the pivot pins 36, 30, and 43 are in substantial alignment with each other, whereby any attempt to pry the window pane open will be resisted by the link. When, however, it is desired to lower the window pane, the plug 61 of the valve will be moved to such position where the passageway 67 will connect the suction pipe 68, through the port 65, with the pipe 54, through the port 62, and the passageway 66 will simultaneously be moved to such position where it will connect the pipe 55, through the port 63, to the atmosphere through the port 64. This will allow atmospheric pressure to enter the port 64 and pass to the cylinder through the passageway 66 of the plug and pipe 55, thereby pressing the piston 56 downwardly toward the lower end of the cylinder. The first movement of the piston and piston rod will cause the block 53, to which the upper end of the rod is connected, to be moved downwardly in the slot 51 formed in the sliding plate 14. Such movement will cause the block to bear against the cam face 52 of the cam arm 50, and thereby cause the upper link portion 26 of the toggle stop-link to be rotated slightly in counterclockwise direction, thus moving the stop-link pivot pin 30 out of straight-line alignment with the pivot pins 36 and 43 at the ends of the toggle stop-link, and thus unlock the device. When the block 53 reaches the lower end of the slot 51, it will come into engagement with the sliding plate 14 and further downward movement of the rod will cause this plate, together with the window pane, to be drawn downwardly the desired amount. As the window pane is being lowered, the upper and lower portions 26 and 27, respectively, of the toggle stop-link will be moved toward each other about their common pivot point 30. On the upward movement of the window pane, the cam block 53 will first of all be moved upwardly to the limit of its travel in the slot 51, after which the plate 14, together with the window pane, will be positively moved upwardly to its closed position. During such movement, the upper and lower portions 26 and 27, respectively, of the stop-link will be rotated about their pivots toward their straight-line, locked position, shown in Fig. 1. If, for any reason, the window should not be fully closed when in this position, the adjustable bolt 43 may be loosened and moved along to the left in the slot 46 until the desired position of the window pane has been reached, whereupon the bolt will again be tightened in place by means of the nut 47.

Having thus described our invention, what we claim is:

1. The combination with a vehicle of a window pane operating device, comprising a centrally arranged vertical guide fixed to the vehicle, an attaching member secured to the window pane and slidable on said guide, jointed-link stop means for normally locking the window pane in its closed position, said stop means having its lower end pivotally connected to said vehicle and its upper end pivotally connected to said attaching member, single pneumatic actuating means carried by the vehicle and having a piston rod, unlocking means connecting said piston rod and said stop means, the part of said unlocking means which is carried by said piston rod having a limited amount of initial, relative movement with said attaching means to unlock said stop means, and said unlocking means being movable with said attaching member after such initial relative movement.

2. The combination with a vehicle of a window pane operating device, comprising a centrally arranged vertical guide fixed to the vehicle, an attaching member secured to the window pane and slidable on said guide, a toggle stop-link for normally locking the window pane in its closed position, said stop-link having its lower end pivotally connected to said vehicle and its upper end pivotally connected to said attaching member, single pneumatic actuating means carried by the vehicle and having a piston rod, unlocking means connecting said piston rod and said stop means, the part of said unlocking means which is carried by said piston rod having a limited amount of initial, relative movement with said attaching means to unlock said stop means, and said unlocking means being movable with said attaching member after such initial, relative movement.

3. The combination with a vehicle of a window pane operating device, comprising a centrally arranged vertical guide fixed to the vehicle, an attaching member slidable on said guide, means carried by said window pane for detachable connection to said attaching member, jointed-link stop means for normally locking the window pane in its closed position, said stop means having its lower end pivotally connected to said vehicle and its upper end pivotally connected to said attaching member, single pneumatic actuating means carried by the vehicle and having a piston rod, unlocking means connecting said piston rod and said stop means, the part of said unlocking means which is carried by said piston rod having a limited amount of initial, relative movement with said attaching means to unlock said stop means, and said unlocking means being movable with said attaching member after such initial relative movement.

4. The combination with a vehicle of a window pane operating device, comprising a centrally arranged vertical guide fixed to the vehicle, an attaching member secured to the window pane and slidable on said guide, a toggle stop-link for normally locking the window pane in its closed position, said stop-link having its lower end pivotally connected to said vehicle, and movable sidewise in a slot for adjustment, and its upper end pivotally connected to said attaching member, single pneumatic actuating means carried by the vehicle and having a piston rod, unlocking means connecting said piston rod and said stop means, the part of said unlocking means which is carried by said piston rod having a limited amount of initial, relative movement with said attaching means to unlock said stop means, and said unlocking means being movable with said attaching member after such initial, relative movement.

5. The combination with a vehicle of a window pane operating device, comprising a centrally arranged vertical guide fixed to the vehicle, an attaching member secured to the window pane and slidable on said guide, a toggle stop-link for normally locking the window pane in its closed position, said stop-link having its lower end pivotally connected to said vehicle and its upper end pivotally connected to said attaching member, single pneumatic actuating means carried by the vehicle and having a piston rod, the upper end of the toggle link being formed, beyond the pivotal connection to the attaching member, with a cam arm, a cam block carried by said piston rod and slidably mounted in said member for limited initial movement therewith, said cam block being engageable with said cam arm, said cam block and attaching member being movable together for opening the window after said initial movement.

6. The combination with a vehicle of a window pane operating device, comprising a centrally arranged vertical guide fixed to the vehicle, an attaching plate slidably mounted upon said guide, a window channel secured to the window pane, means for detachably securing the channel to the plate, jointed-link stop means for locking the window pane in its closed position, said stop means having its lower end pivotally connected to said vehicle and its upper end pivotally connected to said attaching member, single pneumatic actuating means carried by the vehicle and having a piston rod, unlocking means connecting said piston rod and said stop means, the part of said unlocking means which is carried by said piston rod having a limited amount of initial, relative movement with said attaching means to unlock said stop means, and said unlocking means being movable with said attaching member after such initial, relative movement.

7. The combination with a vehicle of a window pane operating device, comprising a centrally arranged vertical guide fixed to the vehicle, an attaching plate slidably mounted upon said guide, a window channel secured to the window pane, means for detachably securing the channel to the plate, a toggle stop-link for normally locking the window pane in its closed position, said stop-link having its lower end pivotally connected to said vehicle and its upper end pivotally connected to said attaching plate, single pneumatic actuating means carried by the vehicle and having a piston rod, the upper end of the toggle link being formed, beyond its pivotal connection to the attaching plate, with a cam arm, a cam block carried by said piston rod and slidably mounted in said plate for limited initial movement therewith, said cam block being engageable with said cam arm, said cam block and attaching member being movable together for opening the window after said initial movement.

EMILE GIFFONIELLO.
EDWARD BAMBERG.